(12) United States Patent
Chou

(10) Patent No.: US 12,529,670 B2
(45) Date of Patent: Jan. 20, 2026

(54) INORGANIC CARBON (IC) EXCLUDED CONDUCTIVITY MEASUREMENT OF AQUEOUS SAMPLES

(71) Applicant: BL TECHNOLOGIES, INC., Minnetonka, MN (US)

(72) Inventor: Oliver Chou, Boulder, CO (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 679 days.

(21) Appl. No.: 17/797,904

(22) PCT Filed: Feb. 5, 2020

(86) PCT No.: PCT/US2020/016707
§ 371 (c)(1),
(2) Date: Aug. 5, 2022

(87) PCT Pub. No.: WO2021/158213
PCT Pub. Date: Aug. 12, 2021

(65) Prior Publication Data
US 2023/0152266 A1   May 18, 2023

(51) Int. Cl.
*G01N 27/27* (2006.01)
*G01N 27/333* (2006.01)

(52) U.S. Cl.
CPC ........... *G01N 27/27* (2013.01); *G01N 27/333* (2013.01)

(58) Field of Classification Search
CPC .. G01N 27/27; G01N 27/333; G01N 33/1806; G01N 27/06
See application file for complete search history.

(56) References Cited

U.S. PATENT DOCUMENTS

| | | | |
|---|---|---|---|
| 4,293,522 A | 10/1981 | Winkler | |
| 5,798,271 A | 8/1998 | Godec et al. | |
| 6,228,325 B1 * | 5/2001 | Godec ................... | G01N 27/06 422/80 |
| 2003/0211626 A1 | 11/2003 | Davenport et al. | |
| 2017/0241930 A1 | 8/2017 | Roberts | |

FOREIGN PATENT DOCUMENTS

| | | |
|---|---|---|
| CN | 1479094 A | 3/2004 |
| TW | 201415027 A | 4/2014 |
| WO | 9738304 A1 | 10/1997 |
| WO | 9803855 | 1/1998 |
| WO | 2007053515 A1 | 5/2007 |

OTHER PUBLICATIONS

International Search Report and Written opinion, in connection with International Application No. PCT/US2020/016707, dated Oct. 23, 2020.

(Continued)

*Primary Examiner* — Samuel P Siefke
(74) *Attorney, Agent, or Firm* — Meunier Carlin & Curiman LLC

(57) ABSTRACT

Devices and methods are disclosed for determination of conductivity without inorganic carbon contribution in aqueous process streams. In particular, devices and methods for determining the ionic conductivity of aqueous process streams containing dissolved $CO_2$.

19 Claims, 4 Drawing Sheets

(56) References Cited

OTHER PUBLICATIONS

Japanese Patent Application No. 2022-547726, Notice of Reasons for Refusal issued Oct. 3, 2023, 6 pages.
Office Action in connection to TW Application No. 110103009, dated Jun. 26, 2024.
Office Action in connection to CN Application No. 2020800956377, dated Apr. 22, 2024.
Examination Report in connection with IN Application No. 202247048730, dated Oct. 1, 2025.

* cited by examiner

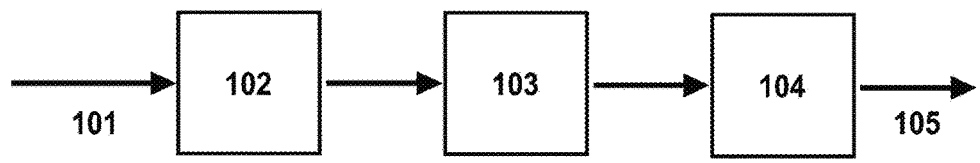
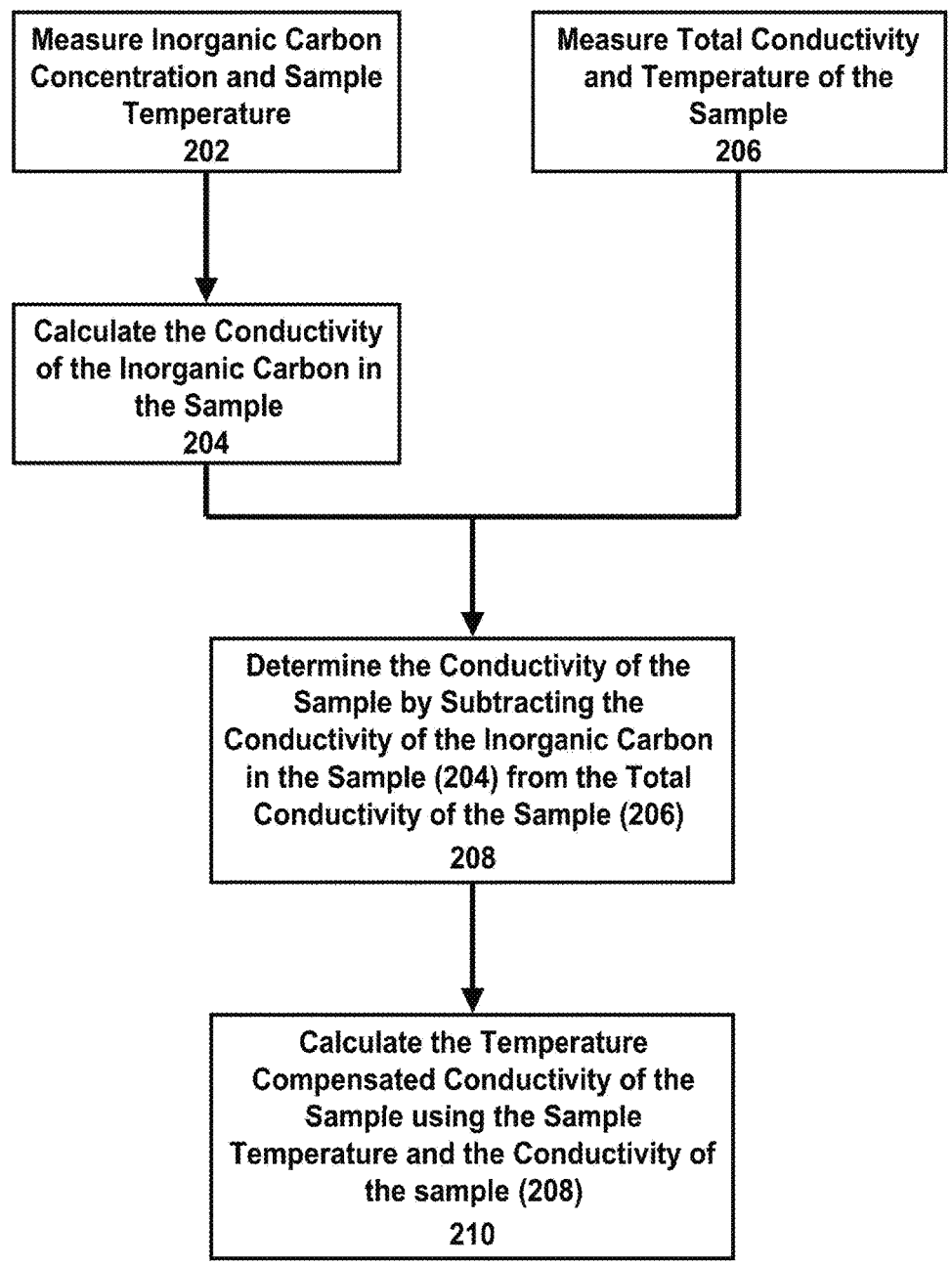
FIG. 1
FIG. 2

INORGANIC CARBON (IC) EXCLUDED CONDUCTIVITY MEASUREMENT OF AQUEOUS SAMPLES

CROSS REFERENCE TO RELATED APPLICATIONS

This application is a § 371 U.S. National Stage Application of International Patent App. No. PCT/US2020/016707, filed on Feb. 5, 2020, which is incorporated herein by reference in its entirety.

FIELD

The embodiments described herein generally relate to methods and apparatus for making very precise, reliable and reproducible measurements of the conductivity of aqueous samples. Specifically, the conductivity of aqueous samples without the inorganic carbon contribution. Such methods and apparatus may be used, for example, to determine an ionic specific conductivity value for drinking water, raw water, wastewater, industrial process streams and the like. Such measurement may be utilized for various important commercial purposes, for example to optimize water purification processes, to detect spills, and to monitor compliance with environmental regulations. The methods and apparatus described herein are especially useful for making precise, reliable and reproducible measurements of conductivity value of clean aqueous samples commonly found in pharmaceutical and healthcare industries. The methods and apparatus described herein can generally be applied both to measuring discrete aqueous samples, such as those encountered in a laboratory environment, and to monitoring flowing streams to provide real-time conductivity data.

BACKGROUND

Electrical conductivity in water is a well-established water quality parameter that quantifies the overall ionic purity of the water. The electrical conductivity in water is a non-specific measurement meaning that all ions in the solution contribute to the electrical conductivity measurement.

There are three major sources of ions in a water sample. The first source is the water molecules dissociating into ions as a function of temperature and pH. This is done in a very predictable method and is generally negligible compared to the following two sources.

The second source of ions is carbon dioxide ($CO_2$) dissolving in water and interacting and forming ions (e.g., in the form of carbonate and bicarbonate ions). Together, the dissolved $CO_2$ and its dissociated ions are referred to herein as inorganic carbon, or IC.

The final source of ions is extraneous ions. The extraneous ions such as chlorine and ammonium may have a significant impact on the water's chemical purity and suitability for use in pharmaceutical applications. For environmental applications, the extraneous ions are also useful as a general measure of water quality as it is affected by the presence of inorganic dissolved solids such as chloride, nitrate, sulfate, and phosphate anions or sodium, magnesium, calcium, iron, and aluminum cations. Therefore, detecting extraneous ions in a sample is particularly important because extraneous ions in a sample may indicate contamination in environmental monitoring applications or insufficient cleaning in pharmaceutical applications. Industries are not concerned with carbon dioxide and dissociated water molecules as sources of contamination as they are not an indication of contamination or insufficient cleaning.

Disassociated water molecules have very little total contribution to the overall conductivity of a sample. For example, at 25° C., the conductivity of pure water is only 0.055 µS/cm. However, $CO_2$ can have a much larger conductivity contribution. $CO_2$ can contribute up to 1.2 µS/cm to a sample and can vary up to 0.2 µS/cm even when considered "stable." The variation in conductivity from $CO_2$ is due to environmental factors such as the season, latitude, altitude, atmospheric pressure, ventilation, etc. Because the $CO_2$ contribution to conductivity can vary so drastically, it causes the conductivity measurements to be unreliable and inconsistent especially when measuring samples and standards that can range between 0.055 µS/cm for ultrapure water to 10 µS/cm for low level conductivity standards commonly used in the pharmaceutical industry.

Current conductivity measurements are limited in their accuracy and consistency due to the $CO_2$ contributing additional conductivity to any standards or samples. Therefore, it is desirable to determine the conductivity of an aqueous sample without the IC contribution. Accordingly, there is a need for an analyzer that can determine the conductivity of a sample without the IC contribution.

SUMMARY

In some aspects, the present disclosure relates to apparatuses and methods for estimating conductivity of a fluid.

In one aspect, the present disclosure relates to a method for estimating the conductivity of a fluid. Generally, the fluid comprises water. In one embodiment, the method includes the steps of providing a fluid sample treatment apparatus containing an electrode system and a fluid sample; measuring an inorganic carbon concentration value of the fluid sample; measuring a temperature value of the fluid sample; measuring a total electrical conductivity value of the fluid sample using the electrode system; determining an inorganic carbon conductivity value of the fluid sample using the inorganic carbon concentration value and the temperature value of the fluid sample; and calculating a net conductivity value of the fluid sample by subtracting the inorganic carbon conductivity value from the total electrical conductivity value of the fluid sample.

In one embodiment, the method further includes calculating a temperature-compensated conductivity value for the fluid sample at least in part from the net conductivity value of the fluid sample and the temperature value of the fluid sample.

In one aspect, the present disclosure relates to an apparatus for estimating net conductivity of a fluid which is generally an aqueous sample, which, in one embodiment, includes: a fluid conduit configured to contain a fluid, the fluid conduit in fluid communication with: an electrode system effective to measure a total electrical conductivity value of the fluid; and a temperature sensor effective to measure a temperature value of the fluid; an inorganic carbon sensor effective to measure an inorganic carbon concentration value, which comprises at least in part of $CO_2$ of the fluid; a fluid control and measurement system configured to: direct the fluid into the fluid conduit; receive the total electrical conductivity value of the fluid from the electrode system; receive the temperature value of the fluid from the temperature sensor; receive the inorganic carbon concentration value of the fluid from the inorganic carbon sensor; calculate an inorganic carbon conductivity value for the fluid based on at least the inorganic carbon concentration value of the fluid and the temperature value of the fluid; and subtract the inorganic carbon conductivity value for the fluid from the total electrical conductivity value for the fluid to determine a net conductivity value of the fluid.

In one embodiment the fluid control and measurement system is further configured to calculate a temperature-compensated conductivity value for the fluid from the net conductivity value of the fluid and the temperature value of the fluid.

In one embodiment the inorganic carbon sensor includes an acidification module configured to generate an acidified fluid stream to convert at least some of the plurality of carbonate ions and/or plurality of bicarbonate ions in the fluid into $CO_2$; a $CO_2$ selective permeable transfer membrane, wherein the inorganic carbon in the sample is extracted into a deionized water stream; and a conductivity and temperature measurement cell in fluid communication with the second chamber configured to measure a total concentration value for ionic species in the deionized water stream and a temperature value for the deionized water stream.

In one embodiment the fluid control and measurement system comprises a processor that executes computer-executable instructions that cause the processor to direct the fluid into the fluid conduit; receive the total electrical conductivity value of the fluid from the electrode system; receive the temperature value of the fluid from the temperature sensor; receive the inorganic carbon concentration value of the fluid from the inorganic carbon sensor; calculate the inorganic carbon conductivity value for the fluid based on at least the inorganic carbon concentration value of the fluid and the temperature value of the fluid; and subtract the inorganic carbon conductivity value for the fluid from the total electrical conductivity value for the fluid to determine the net conductivity value of the fluid.

In one embodiment the fluid control and measurement system comprises a processor that executes computer-executable instructions that adds an appropriate amount of acid to a sample fluid in a cell; receives a conductivity and temperature measurement from the cell; and calculates an inorganic carbon concentration value of the fluid from the temperature and conductivity measurement of the cell.

In another aspect, the present disclosure relates to a non-transitory computer readable medium. In one embodiment, the non-transitory computer readable medium is configured to store instructions that when executed cause a processor to perform: measuring an inorganic carbon concentration value which comprises at least in part of $CO_2$ of a fluid sample; measuring a temperature value of the fluid sample measuring a total electrical conductivity value of the fluid sample; determining an inorganic carbon conductivity value using the inorganic carbon concentration value and the temperature value of the fluid sample; and calculating a net conductivity value of the fluid sample by subtracting the inorganic carbon conductivity value from the total electrical conductivity value of the fluid sample.

In one embodiment, the non-transitory computer readable medium is configured to store instructions that when executed causes a processor to add acid from a reservoir to the aqueous sample stream.

In one embodiment, the non-transitory computer readable medium is configured to store instructions that when executed cause a processor to perform: calculating a temperature-compensated conductivity value for the fluid sample which is an aqueous solution at least in part from the net conductivity value of the fluid sample and the temperature value of the fluid sample.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 (Block Diagram) illustrates a process flow configuration, showing the high level mechanical components and electronics.

FIG. 2 illustrates the process used by some embodiments of the present disclosure to determine the temperature compensated conductivity of the sample

DETAILED DESCRIPTION

Figure 3:
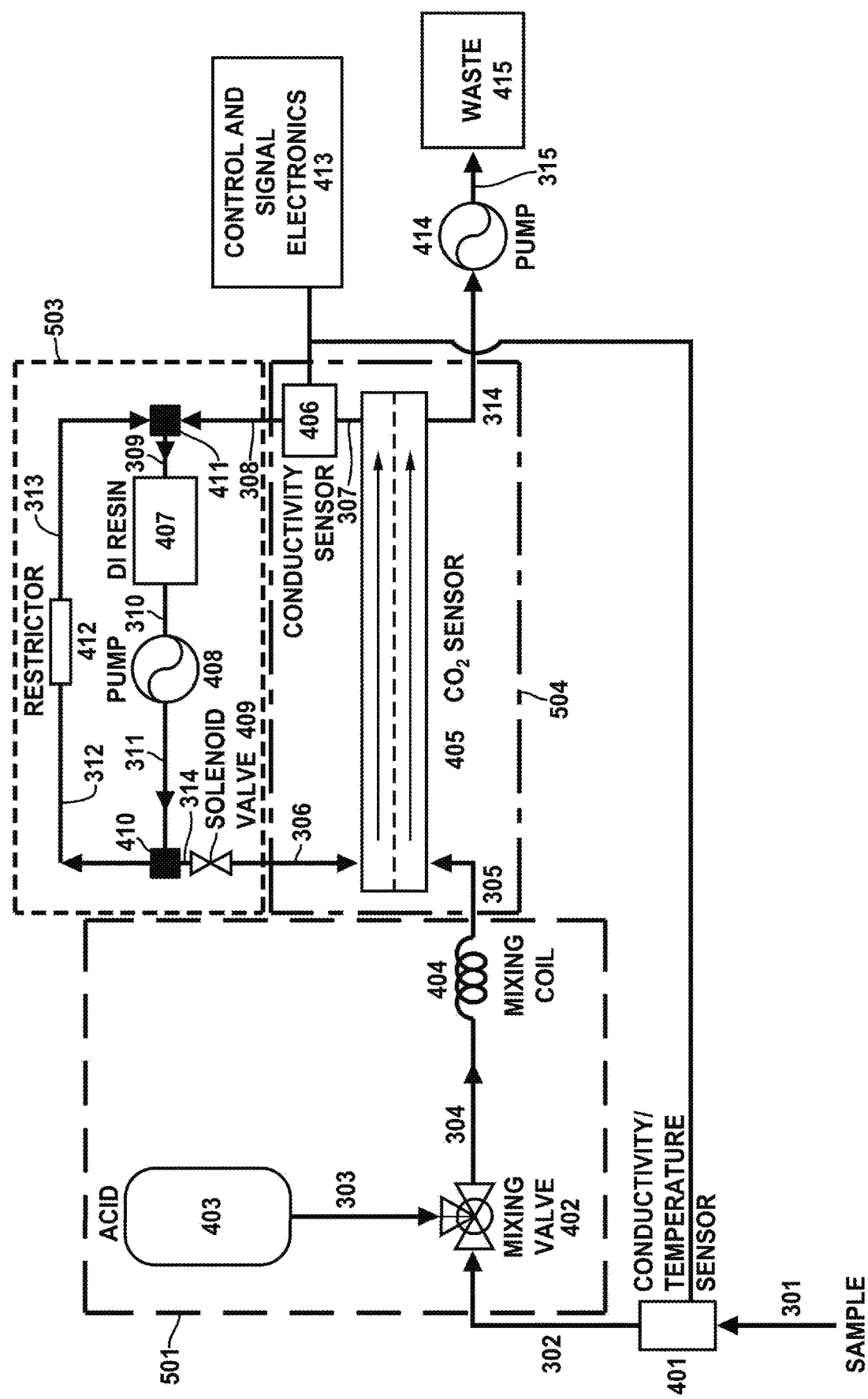
FIG. 3 illustrates a block diagram of an embodiment of the present disclosure.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

An embodiment of the present disclosure comprises the mechanical components shown in FIG. 1, plus electronics necessary to (1) make conductivity and temperature measurements, (2) make IC concentration measurements (3) calculate ionic conductivity. Hardware shown in FIG. 1 comprises an inlet 101 connected to a liquid (e.g., water) source (not shown) 102, a cell for measurement of electrical conductivity and/or electrical resistivity 103 (preferably having a temperature sensor 104), electronics for measuring IC concentration, and an outlet 105 through which analyzed water is discharged. For example, the components of FIG. 1 may comprise a total organic compound (TOC) analyzer such as the one described in U.S. Pat. No. 5,132,094 issued Jul. 21, 1992, which is fully incorporated by reference and made a part hereof.

FIG. 2 is a block diagram of a non-limiting illustration of one configuration of a method for determining the conductivity of a fluid sample without the inorganic carbon contribution. In some instances, all or parts of the disclosed method may be performed by the apparatus shown and described in FIG. 1. As shown in FIG. 2, the inorganic carbon concentration of the sample, and sample temperature, are measured 202. Using these parameters, the conductivity of the inorganic carbon in the sample can be calculated 204. The total conductivity of the sample is also measured 206. The total conductivity and temperature of the sample can be measured either in parallel or in series with the measurement of the inorganic carbon concentration and sample temperature as long as the two measurements do not adversely affect one another. The conductivity of the inorganic carbon in the sample is a function of the concentration of the inorganic carbon in the sample and the sample temperature. The total conductivity of the sample is the sum of the conductivity due to the inorganic carbon in the sample and the conductivity due to the dissolved extraneous ions in the sample. Therefore, as shown in 208, subtracting the conductivity due to the inorganic carbon in the sample from the total conductivity of the sample yields the conductivity due to the dissolved extraneous ions in the sample. The temperature compensated conductivity due to the dissolved ions in the sample can then be determined using the temperature of the sample. The temperature compensated conductivity value of the sample 210 can be calculated using the sample temperature measured 206 and the calculated conductivity 208. In some instances, the inorganic carbon concentration and/or temperature and/or total conductivity of the sample are measured in the same chamber. In some embodiments, an electrode system may be used to measure the conductivity of the sample. For example, the electrode system may be used to measure the total conductivity of the sample.

A block diagram of one embodiment of an apparatus for determining the conductivity of a sample without the IC contribution is shown in FIG. 3. An aqueous sample inlet opening 301 is in communication with a conductivity/temperature sensor 401 for the measurement of total conductivity and temperature of the aqueous sample. The output of the conductivity sensor increases rapidly as the aqueous sample flows into the cell. After a short period of dine, the conductivity reaches its maximum value. At this point, the conductivity is recorded and used in later calculations for the ionic conductivity of the sample.

In some instances, the conductivity/temperature sensor 401 contains two electrodes mounted in a nonconductor, such as plastic. The temperature sensor may be located outside of the cell holding the sample, but close to one of the conductivity electrodes. Proximity to the metal electrode provides effective heat transport from water to the temperature sensor for accurate temperature measurements.

In some instances, the electrodes in conductivity and temperature measuring system may be corrosion resistant metals such as nickel as well as other corrosion resistant metals.

In some instances, the samples may contain residual trace amounts of oxidants such as hydrogen peroxide. The electrode materials are preferably substantially inert to such oxidants, including not absorbing the latter, and not forming active oxidizing species on the electrode surfaces. Such absorbed oxidants and/or active oxidizing species, if not destroyed by the conductivity measurement, may give rise to trace oxidation of organics in a subsequent measurement of conductivity.

Temperature and conductance and/or resistance measuring system broadly includes measuring circuits and electronics, though not shown in FIG. 3. The latter may for example apply a constant audio frequency current (e.g., 1 KHz) and measure the voltage required to obtain such current or apply a constant audio frequency voltage measuring the current thereby obtained, in either case preferably correcting for capacitance or reactance in the measuring circuit.

Although the temperature and conductance and/or resistance measuring system has been described in terms of electrodes, such system may also comprise an electrodeless system, particularly advantageous in some embodiments. Such electrodeless system includes measuring reactive losses in system or coupling between coils wound around system.

The aqueous sample passes through the conductivity and temperature measurement cell. The conductivity caused by the presence of ionic species in the aqueous sample is measured by the conductivity/temperature sensor 401 and associated control and signal electronics 413. The conductivity/temperature sensor 401 is connected to a suitable power supply (not shown) and the electrical output from the micro-conductivity sensor is connected to the control and signal electronics 413.

The outlet 302 of the conductivity/temperature sensor 401 is in communication with the inlet of a mixing valve 402 in the acidification module 501 through conduit 302. In this embodiment of the invention, the acidification module 501 comprises an acid reservoir 403, the mixing valve 402 and a mixing coil 404. Aqueous acid, for example 3M phosphoric acid or 3M sulfuric acid, from the acid reservoir 403 is in communication with the inlet of the mixing valve 402 through conduit 303. The two inlets to the mixing valve 402 (the sample and the acid 403) is mixed and the result in a decrease in the pH of the aqueous sample. The outlet of the mixing valve 402 is in communication with the inlet of the mixing coil 404 through conduit 304. The acid and the aqueous sample is thoroughly mixed in the mixing coil 404 so that the desired pH of the aqueous sample stream effluent of the acidification module 501 is a pH of less than about 4. Inorganic carbon species—primarily carbonate and bicarbonate ions—are reacted with the acid to form carbon dioxide. The acidified aqueous sample effluent of the acidification module 501 is in communication with a carbon dioxide sensor module 504 via conduit 305.

The aqueous sample inlet of the carbon dioxide sensor 405, which contains a gas permeable membrane, is positioned such that the flowing aqueous sample stream passes on one side of the gas permeable membrane. A deionized water module 503 is in communication with the deionized water inlet of the carbon dioxide sensor 405 via the deionized water module outlet conduit 306. The inlet is positioned to permit passage of deionized water on the opposite side of the gas permeable membrane from that of the aqueous sample stream. The carbon dioxide selective membrane is positioned between two stainless steel meshes. These mesh elements support the carbon dioxide selective membrane and facilitate mixing in the two aqueous solutions by producing turbulent flow. A relatively thin layer of deionized water is maintained on the deionized water side of the gas permeable membrane to facilitate rapid analysis times. As the acidified aqueous sample passes through the carbon dioxide sensor module, the carbon dioxide rapidly diffuses across the gas permeable membrane. The gas permeable membrane is constructed of a material that permits diffusion of carbon dioxide and other inorganic gases but will not permit diffusion of organic acids and other volatile organic compounds.

In the measurement cycle of the carbon dioxide sensor 405, the solenoid valve 409 is switched to the ON position to introduce a sample of deionized water via conduit 306 into the deionized water inlet of the carbon dioxide sensor 405. After a period of time, the solenoid valve 409 is returned to the OFF position. As the sample stream passes on one side of the gas permeable membrane of the carbon dioxide sensor 405, the carbon dioxide diffuses across the gas permeable membrane into the deionized water sample on the opposite side of the membrane, where the carbon dioxide is converted into ionic species. After a short period of time an equilibrium is established between the concentration of carbon dioxide in the flowing aqueous sample stream and the deionized water sample across the gas permeable membrane.

The operation of the sensor 405 is based on the establishment of an equilibrium across the carbon dioxide selective gas permeable membrane existing between the aqueous sample stream and a deionized water sample. After this equilibrium has been established, the solenoid valve 409 is switched to the ON position and the deionized water sample containing carbon dioxide in the form of carbonate and bicarbonate water is passed into a conductivity/temperature sensor 406 by means of the circulating pump 408 through conduit 307. In this one embodiment, the conductivity/temperature sensor 406 is a conductivity cell which includes a conductivity electrode and temperature sensor used for temperature compensation in the conductivity measurement. The output of the conductivity sensor 406 increases rapidly as the deionized water flows into the cell. After a short period of time, the conductivity reaches its maximum value. At this point, the conductivity is recorded and used in later calculations for the inorganic carbon concentration.

The increase in conductivity caused by the presence of ionic species formed from carbon dioxide is measured by the conductivity cell 406 and associated control and signal module 413. The observed increase in the conductivity of the deionized water sample can be directly related to the concentration of carbon dioxide present in the aqueous sample stream. The carbon dioxide sensor has a linear response to the concentration of carbon dioxide in the aqueous sample stream for the analysis of aqueous samples containing 0.05 to 125 mg/L of carbon.

The outlet of the micro-conductivity sensor 406 is in communication via a conduit 308 to the other inlet of the second tee 411. The micro-conductivity sensor 406 is connected to a suitable power supply (not shown) and the electrical output from the micro-conductivity sensor is connected to the control and signal electronics module 413.

The deionized water module 503 comprises a mixed bed of anion and cation ion exchange resins 407 in communication via a conduit 310 with a circulating pump 408 which is in communication via a conduit 311 to a tee 410. One outlet of the tee 410 is in communication via conduit 314 with the solenoid shut-off valve 409, and the other outlet of the tee is in communication via a conduit 312 to a flow restrictor 412. The outlet of the solenoid shut-off valve 409 is in communication via the deionized water outlet conduit 306 with the deionized water inlet of the carbon dioxide sensor module 504. The outlet of the flow restrictor 412 is in communication via a conduit 313 to one inlet of a second tee 411 and the outlet of the tee is in communication via a conduit 309 to the inlet of the ion exchange resin bed 407.

A continuous supply of deionized water is produced in the deionized water module 503 by passing an aqueous stream of water through the mixed bed ion exchange resins 407 by means of the circulating pump 408 with the solenoid valve 409 in the closed position.

The control and electronic module 413 is comprised of a computer or comparable electronic device capable of controlling the voltages and currents to all of the electrical components of the present invention, actuation of valves and switches in a pre-determined timed sequence, processing of the electrical signal from the micro-conductivity sensor and the calculation of total inorganic carbon concentration from output of the conductivity sensor.

The aqueous sample outlet of the carbon dioxide sensor 314 is in communication with the inlet of a peristaltic sampling pump 414, and the outlet of the sampling pump is connected via a conduit 315 to a suitable waste container 315.

As described above, the peristaltic sampling pump 414 is used to draw the aqueous sample from the sample inlet 301, through the acidification module 501, and the carbon dioxide sensor module 504. The peristaltic sampling pump 414 withdraws an aqueous sample via the sample inlet opening 301, at a desired flow rate of approximately 50 to 100 microliters per minute.

Further embodiments and/or aspects of the apparatus and/or processes include: (a) omitting the temperature measurement, in which case conductance and/or resistance measurements, uncompensated for temperature, (b) For some uses of the apparatus and process of the present disclosure, it is desirable to generate a signal if the conductivity estimated by the apparatus and process is more than, or is less than, a predeterminable value of such estimate. For example, it may be sufficient if the apparatus and process energize a green light emitting diode if the conductivity estimated is less than a predeterminable value and/or energize a red light (and/or an audible alarm) if the content estimated is greater than such predeterminable value. For such uses it may not be necessary to display a estimate of conductivity (c) The apparatus and process of some embodiments have been described and/or exemplified that electrical conductance and/or electrical resistance may be determined with electrodeless methods.

Figure 4:
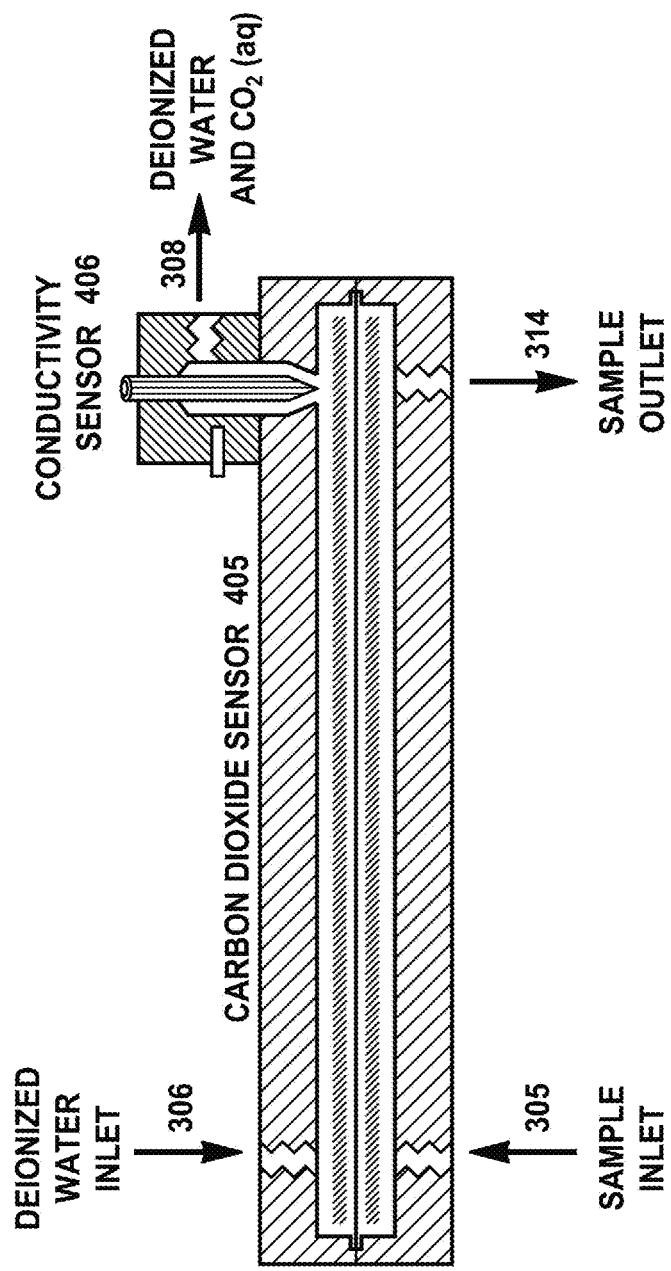
FIG. 4 is a schematic representation of a carbon dioxide sensor component with an internal conductivity sensor that may be used in embodiments of the disclosure.

A second embodiment of the carbon dioxide sensor is shown in FIG. 4 In this design, conduit 307 has been eliminated and the conductivity electrode and temperature sensor are an integral parts of the carbon dioxide sensor 405.

Figure 5:
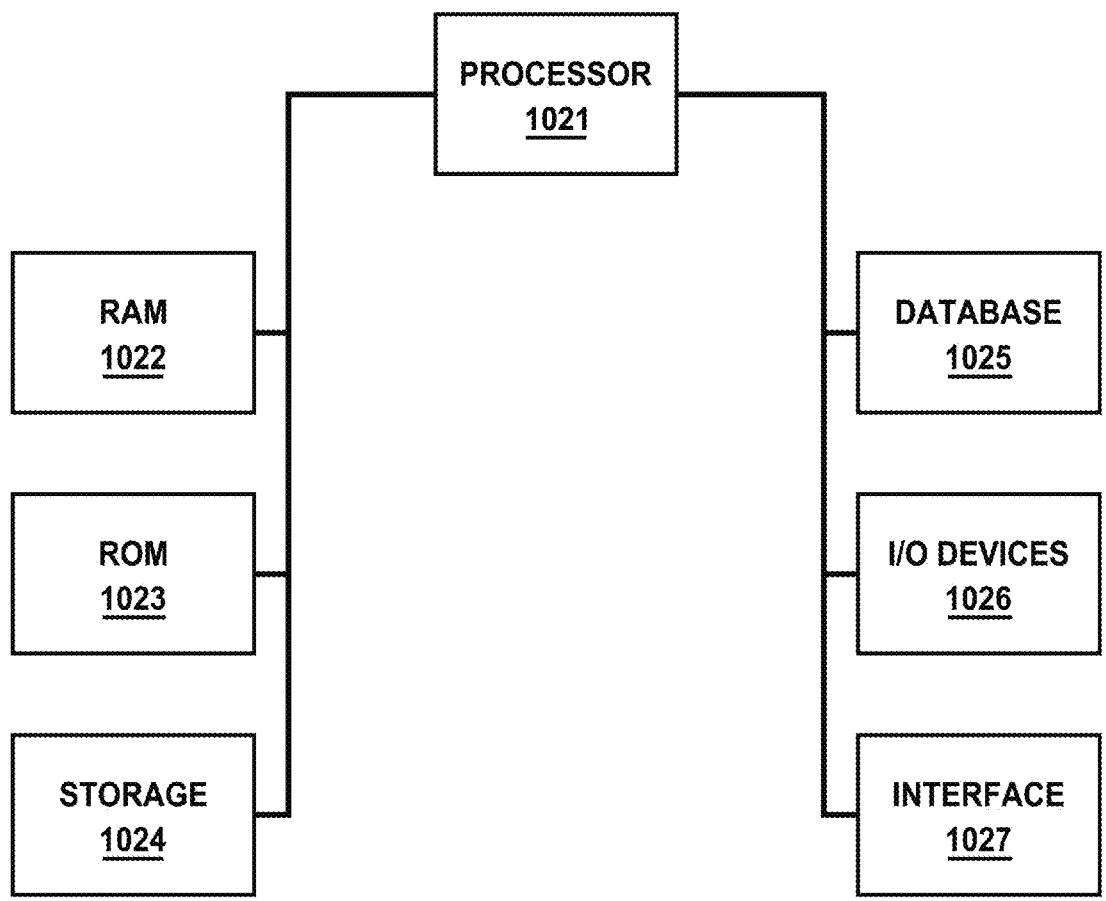
FIG. 5. illustrates an exemplary computer that may comprise all or a portion of a fluid flow control and measurement system, and/or a separate control system; conversely, any portion or portions of the computer illustrated in FIG. 5 may comprise all or a portion of a fluid flow control and measurement system, and/or a separate control system.

FIG. 5 illustrates an exemplary computer that may comprise all or a portion of a fluid flow control and measurement system. Conversely, any portion or portions of the computer illustrated in FIG. 5 may comprise all or a portion of a fluid flow control and measurement system. For example, all or some of the components shown in FIG. 5 may comprise the control and signal electronics 413 described herein. As used herein, "computer" may include a plurality of computers. The computers may include one or more hardware components such as, for example, a processor 1021, a random-access memory (RAM) module 1022, a read-only memory (ROM) module 1023, a storage 1024, a database 1025, one or more input/output (I/O) devices 1026, and an interface 1027. Alternatively, and/or additionally, the computer may include one or more software components such as, for example, a computer-readable medium including computer executable instructions for performing a method associated with the exemplary embodiments such as, for example, an algorithm for determining the conductivity of dissolved ions in a sample. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for controlling a system (e.g., a TOC analyzer) and/or receiving and/or processing and/or transmitting data associated with a network of measuring devices used to generate remote sensing data. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by the computer and/or processor 1021. For example, database 1025 may store data related to the remote sensing data correlated with signal attenuation. The database may also contain data and instructions associated with computer-executable instructions for controlling a system (e.g., a system for analyzing sample conductivity) and/or receiving and/or processing and/or transmitting data associated with a network of sensor nodes used to measure sample conductivity. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, radios, receivers, transmitters, transceivers, and any other type of device configured to enable data communication via a wired or wireless communication network.

The figures illustrate the architecture, functionality, and operation of possible implementations of systems, methods and computer program products according to various implementations of the present disclosure. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. Many modifications and variations will be apparent to those of ordinary skill in the art without departing from the scope and spirit of the present disclosure.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for estimating conductivity of a fluid, the method comprising:
   providing a fluid sample treatment apparatus containing an electrode system and a fluid sample;
   measuring an inorganic carbon concentration value of the fluid sample;
   measuring a temperature value of the fluid sample;
   measuring a total electrical conductivity value of the fluid sample using the electrode system;
   determining an inorganic carbon conductivity value of the fluid sample using the inorganic carbon concentration value and the temperature value of the fluid sample; and
   calculating a net conductivity value of the fluid sample by subtracting the inorganic carbon conductivity value from the total electrical conductivity value of the fluid sample.

2. The method of claim 1, wherein the method further comprises calculating a temperature-compensated conductivity value for the fluid sample at least in part from the net conductivity value of the fluid sample and the temperature value of the fluid sample.

3. The method of claim 1, wherein the inorganic carbon comprises at least in part $CO_2$.

4. The method of claim 1, wherein the fluid sample comprises water.

5. An apparatus for estimating net conductivity of a fluid, the apparatus comprising:
   a fluid conduit configured to contain a fluid, the fluid conduit in fluid communication with:
     an electrode system effective to measure a total electrical conductivity value of the fluid; and
     a temperature sensor effective to measure a temperature value of the fluid; and
     an inorganic carbon sensor effective to measure an inorganic carbon concentration value of the fluid; and
   a fluid control and measurement system configured to:
     direct the fluid into the fluid conduit;
     receive the total electrical conductivity value of the fluid from the electrode system;
     receive the temperature value of the fluid from the temperature sensor;
     receive the inorganic carbon concentration value of the fluid from the inorganic carbon sensor;
     calculate an inorganic carbon conductivity value for the fluid based on at least the inorganic carbon concentration value of the fluid and the temperature value of the fluid; and
     subtract the inorganic carbon conductivity value for the fluid from the total electrical conductivity value for the fluid to determine a net conductivity value of the fluid.

6. The apparatus of claim 5, wherein the fluid control and measurement system is further configured to calculate a temperature-compensated conductivity value for the fluid from the net conductivity value of the fluid and the temperature value of the fluid.

7. The apparatus of claim 5, wherein the inorganic carbon sensor includes an acidification module configured to generate an acidified fluid stream.

8. The apparatus of claim 7, wherein the fluid includes a plurality of carbonate ions and/or a plurality of bicarbonate ions, and the acidification module is configured to convert at least some of the plurality of carbonate ions and/or plurality of bicarbonate ions in the fluid into $CO_2$.

9. The apparatus of claim 7, wherein the inorganic carbon sensor includes:
   a $CO_2$ selective permeable transfer membrane; and
   a first chamber and a second chamber, the first chamber in fluid communication with an outlet of the acidified fluid stream, wherein the first chamber and the second chamber are separated by the $CO_2$ selective permeable transfer membrane, wherein the inorganic carbon sensor is configured to extract the $CO_2$ into a deionized water stream.

10. The apparatus of claim 9, wherein the inorganic carbon sensor includes:
    a conductivity and temperature measurement cell in fluid communication with the second chamber configured to measure a total concentration value for ionic species in the deionized water stream and a temperature value for the deionized water stream.

11. The apparatus of claim 5, wherein the inorganic carbon comprises $CO_2$.

12. The apparatus of claim 5, wherein the fluid control and measurement system comprises a processor that executes computer-executable instructions that cause the processor to:
    direct the fluid into the fluid conduit;
    receive the total electrical conductivity value of the fluid from the electrode system;
    receive the temperature value of the fluid from the temperature sensor;
    receive the inorganic carbon concentration value of the fluid from the inorganic carbon sensor;
    calculate the inorganic carbon conductivity value for the fluid based on at least the inorganic carbon concentration value of the fluid and the temperature value of the fluid; and
    subtract the inorganic carbon conductivity value for the fluid from the total electrical conductivity value for the fluid to determine the net conductivity value of the fluid.

13. The apparatus of claim 5, wherein the fluid control and measurement system comprises a processor that executes computer-executable instructions that cause the processor to:
    add an appropriate amount of acid to the sample fluid in a cell;
    receive a conductivity and temperature measurement from the cell; and
    calculate the inorganic carbon concentration value of the fluid from the temperature and conductivity measurement of the cell.

14. The apparatus of claim 5, wherein the fluid is an aqueous solution.

15. A non-transitory computer readable medium configured to store computer-readable instructions that, when executed by a processor, cause the processor to perform operations comprising:
    measuring an inorganic carbon concentration value of a fluid sample;
    measuring a temperature value of the fluid sample;
    measuring a total electrical conductivity value of the fluid sample;
    determining an inorganic carbon conductivity value using the inorganic carbon concentration value and the temperature value of the fluid sample; and
    calculating a net conductivity value of the fluid sample by subtracting the inorganic carbon conductivity value from the total electrical conductivity value of the fluid sample.

16. The non-transitory computer readable medium of claim 15, wherein the instructions further cause the processor to perform operations comprising:
  calculating a temperature-compensated conductivity value for the fluid sample at least in part from the net conductivity value of the fluid sample and the temperature value of the fluid sample.

17. The non-transitory computer readable medium of claim 15, wherein the inorganic carbon comprises at least in part $CO_2$.

18. The non-transitory computer readable medium of claim 15, wherein the fluid sample comprises water.

19. The non-transitory computer readable medium of claim 15, wherein the instructions further cause the processor to perform operations comprising:
  adding acid from a reservoir to the fluid sample.

* * * * *